Figure 1:
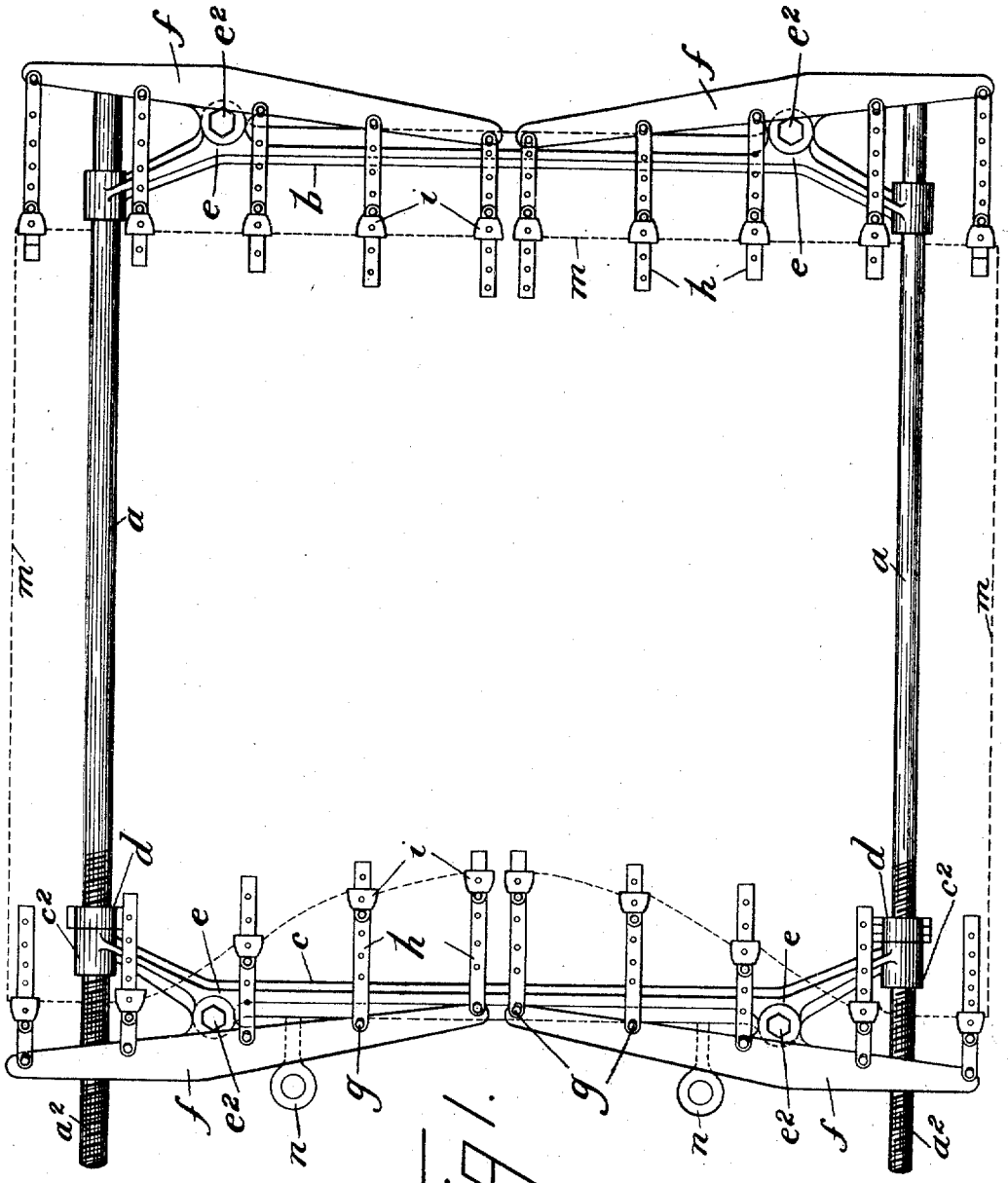

No. 12,417. REISSUED DEC. 12, 1905.

E. L. POST.

MACHINE FOR STRETCHING LEATHER USED FOR MAKING POWER BELTS.

APPLICATION FILED FEB. 6, 1905.

3 SHEETS—SHEET 1.

WITNESSES

M. Rader.

F. A. Stewart.

BY

INVENTOR

Ezra L. Post

Edgar Tate & Co

ATTORNEYS

No. 12,417.
REISSUED DEC. 12, 1905.
E. L. POST.
MACHINE FOR STRETCHING LEATHER USED FOR MAKING POWER BELTS.
APPLICATION FILED FEB. 6, 1905.
3 SHEETS—SHEET 2.
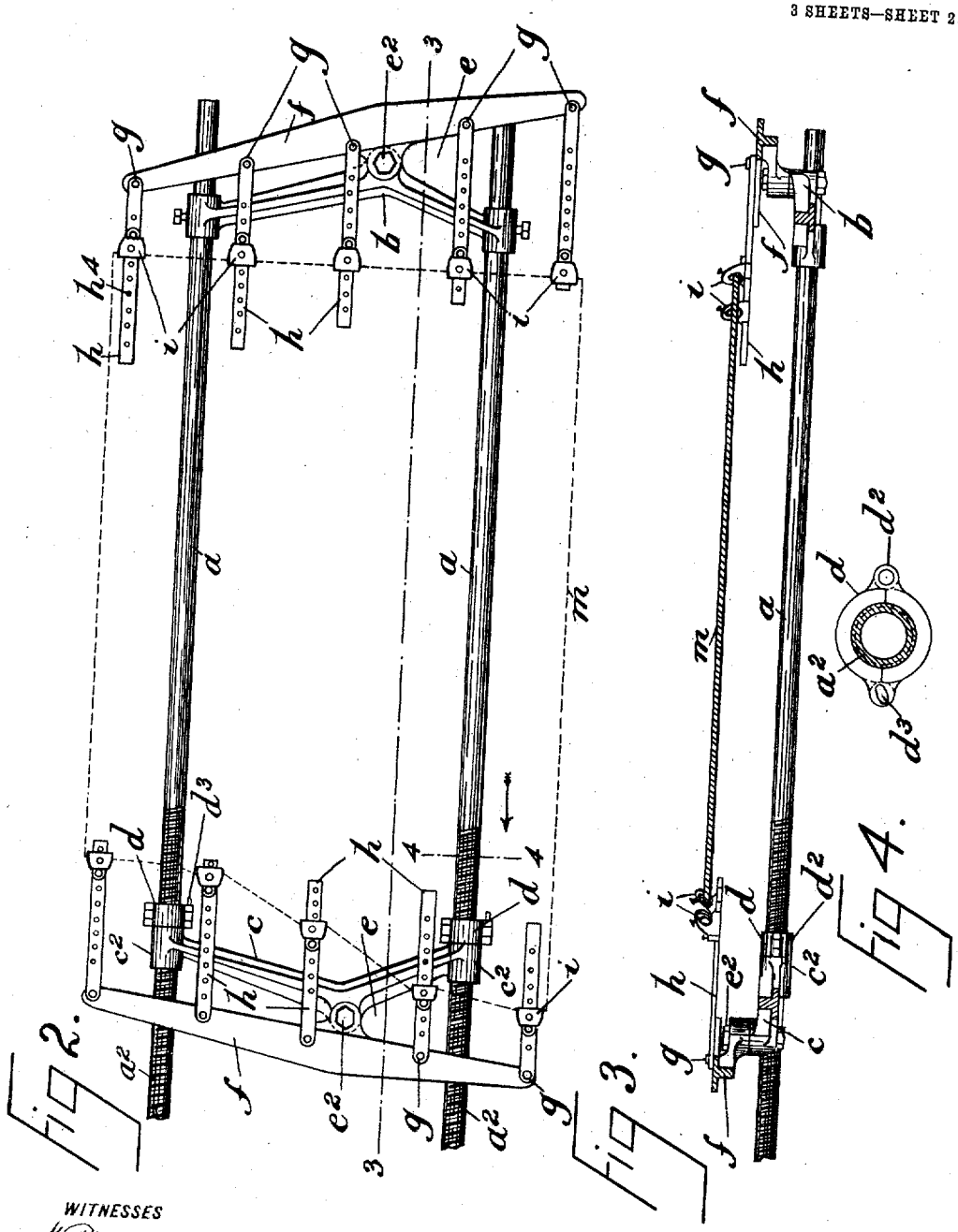
WITNESSES
M. Rader.
F. A. Stewart
BY
INVENTOR
Ezra L. Post
Edgar Tate & Co
ATTORNEYS No. 12,417. REISSUED DEC. 12, 1905.
E. L. POST.
MACHINE FOR STRETCHING LEATHER USED FOR MAKING POWER BELTS.
APPLICATION FILED FEB. 6, 1905.
3 SHEETS—SHEET 3
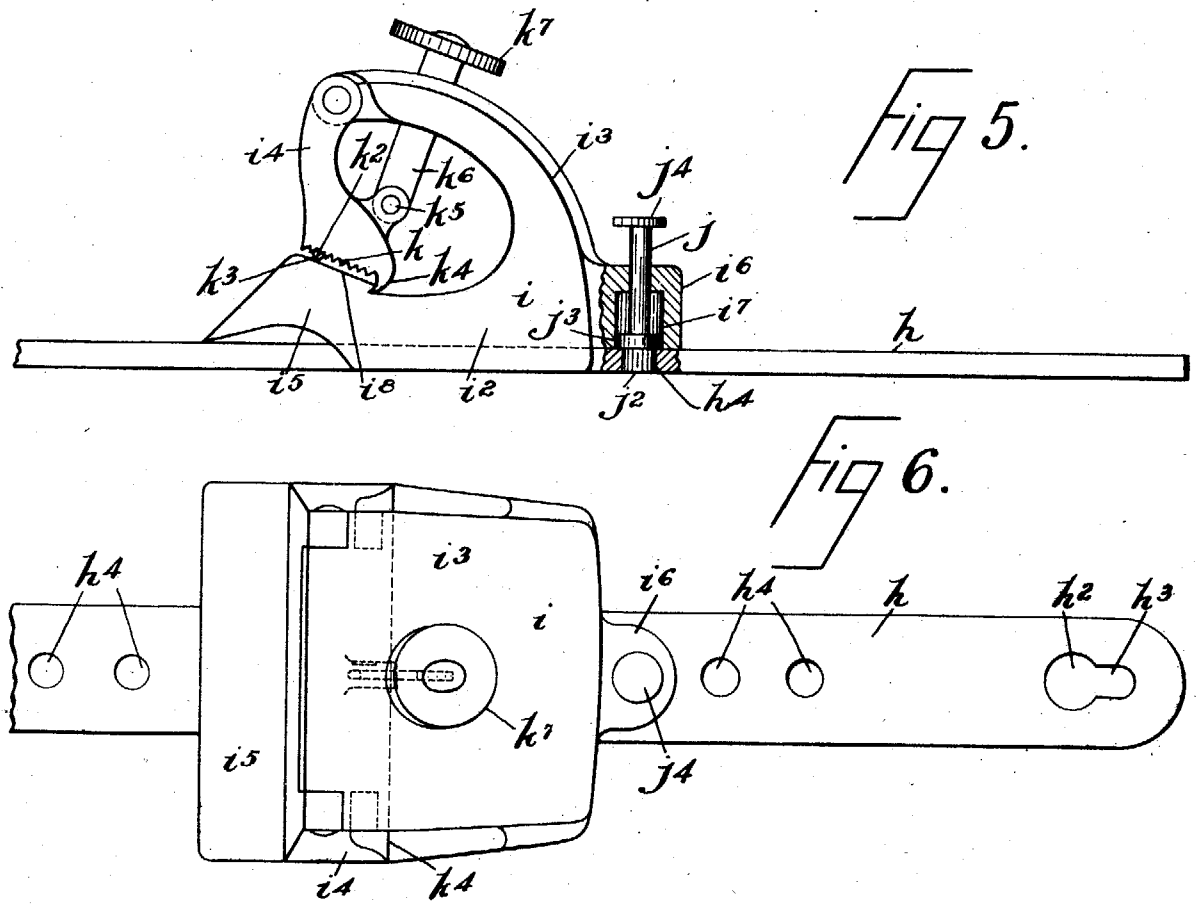
WITNESSES
M. Rader
T. A. Stewart
BY
INVENTOR
Ezra L. Post.
Edgar Tate & Co
ATTORNEYS

UNITED STATES PATENT OFFICE.

EZRA L. POST, OF WALLINGFORD, CONNECTICUT.

MACHINE FOR STRETCHING LEATHER USED FOR MAKING POWER-BELTS.

No. 12,417. Specification of Reissued Letters Patent. Reissued Dec. 12, 1905.

Original No. 772,054, dated October 11, 1904. Application for reissue filed February 6, 1905. Serial No. 244,517.

*To all whom it may concern:*

Be it known that I, EZRA L. POST, a citizen of the United States, residing at Wallingford, in the county of New Haven and State of Connecticut, have invented certain new and useful Improvements in Machines for Stretching Leather Used for Making Power-Belts, of which the following is a specification, such as will enable those skilled in the art to which the invention appertains to make and use the same.

The object of this invention is to provide an improved machine for stretching leather from which power-belts are made, so that the belts when made from such leather will not stretch more at one edge than at the other.

It is a well-known fact that the hides from which belting-leather is made are tougher and stronger along the longitudinal center thereof than at the opposite edges, and when leather made from these hides is cut into strips which are secured together to form power-belts these belts are softer at one edge than at the other and will stretch more at such edges, and this makes the belt longer at one edge than at the other and prevents the same from properly fitting the driving-pulleys and also throws more strain upon one edge of the belt than the other and causes the belt to run crooked or work off of the pulleys. It is also a well-known fact that hides of the class referred to are thicker and softer at the edges or side portions thereof than at the longitudinal center, and in order to avoid the objections above specified to belts made from leather cut from such hides all portions of the leather must be so stretched that when the strips are cut longitudinally from the leather and sewed or otherwise secured together the entire belt so formed will possess throughout its length and breadth the same degree of firmness and strength and the same power of resistance in order that it will not stretch more at one point than at another or at one edge than at another; and the object of this invention is to provide a machine which will accomplish these results.

The invention is fully disclosed in the following specification, of which the accompanying drawings form a part, in which the separate parts of my improvement are designated by suitable reference characters in each of the views, and in which—

Figure 1 is a plan view of one form of my improved machine or apparatus for stretching hides; Fig. 2, a similar view showing the form of machine or apparatus used for stretching half of a hide; Fig. 3, a section on the line 3 3 of Fig. 2; Fig. 4, a section on the line 4 4 of Fig. 2; Fig. 5, a sectional side view of a clutch or clutch-holder which I employ, and Fig. 6 a plan view thereof.

In Fig. 1 of the accompanying drawings I have shown my invention applied in a machine or apparatus for stretching a whole hide, and in the practice of my invention, as shown in this figure, I provide a main frame composed of two longitudinally-arranged and parallel side bars, rods, or tubes $a$, which are preferably cylindrical in form, and these side bars or members are connected at one end by a stationary cross-head $b$ and at the opposite end by a cross-head $c$, movable longitudinally thereon. In the form of construction shown the side bars or frame members $a$ are screw-threaded, as shown at $a^2$. At the end with which the cross-head $c$ is connected said cross-head is provided with end sleeves $c^2$, through which said frame members are free to pass, and mounted on said frame members are nuts $d$, which are preferably of the form shown in Fig. 4, said nuts being split nuts composed of two parts pivotally connected or hinged together at one side, as shown at $d^2$, and connected at the opposite side by a pin or similar device $d^3$, and said nuts may be turned so as to force the cross-head $c$ outwardly, and by running said nuts inwardly on the side frame members $a$ the cross-heads $c$ may also be moved inwardly whenever desired. The cross-heads $b$ and $c$ are preferably of the form shown in the drawings, each being bent outwardly longitudinally of the frame members thereof, as shown at $e$, and pivoted to each of said cross-heads at $e^2$ are two cross-bars $f$, said cross-bars being free to swing over the side frame members $a$ and over the cross-heads $b$ and $c$. Each of the cross-bars $f$ is provided at regular intervals with a pin, screw, or similar device $g$, five of which are employed on each bar in the form of construction shown, and I also provide a plurality of clutch-holders $h$, which equal in number the pins or screws $g$ on each of the bars $f$. The bars $f$ are longer at their inner than at their outer ends, and the clutch-holders $h$ are clearly shown in Figs. 5 and 6, and said bars are provided in one end with a large circular opening $h^2$, adapted to receive the head of the pins or screws $g$ and having an extension $h^3$, adapted to receive the shank or shaft of said pins or screws, and each of said bars is also provided at regular intervals with holes $h^4$. Mounted on each of the bars or clutch-holders $h$ is a clutch $i$, and these clutches consist of a wide base portion $i^2$, an upwardly and forwardly curved arm $i^3$, connected with the rear end of the base portion, and a pivoted jaw $i^4$, suspended from the front end of said arm, the base portion being also provided with a stationary transverse front jaw $i^5$. The connection of the clutch $i$ with the clutch-holder or bar $h$ is made in the manner of a tongue-and-groove joint, the base of the clutches being provided with a longitudinal groove through which the bar $h$ is passed, and the base of the said clutch is also provided at the rear end thereof with a shoulder or projection $i^6$, in which is formed a recess $i^7$, which opens downwardly, and movable vertically in said shoulder and recess is a locking pin or bolt $j$, having an enlarged end $j^2$, adapted to fit in the holes $h^4$, and above which is an annular flange $j^3$, which limits the downward movement of said pin or bolt, and said pin or bolt is provided at its upper end with a disk head or handle $j^4$, by means of which it may be raised, and by means of this construction the clutch or clutches $i$ may be locked to the bars $h$ at any desired point. It will be observed that the transverse stationary jaw $i^5$ of the clutch $i$ is raised above the base portion of said clutch, and the bearing-surface $i^8$ thereof is downwardly and backwardly inclined and said surface is smooth. The jaw $i^4$ is pivoted to the arm $i^3$, and the bearing-surface $k$ thereof when said jaw is in its lowest position is parallel with the bearing-surface of the jaw $i^5$, and slightly above the same the bearing-surface $k$ of the jaw $i^4$ is provided with longitudinal teeth or serrations $k^2$ and with longer teeth or projections $k^3$, which are adapted when the clutch is not in use to rest on the bearing-surface $i^8$ of the jaw $i^5$, and the jaw $i^4$ is also provided at its rear edge with a transverse lip $k^4$, which when said clutch is not in use, as shown in Fig. 4, bears on the rear lower part of the jaw $i^5$. Pivoted to the back of the jaw $i^4$, as shown at $k^5$, is a handle-piece $k^6$, which passes upwardly through a slot or opening in the arm $i^3$ and is provided with a knob or handle $k^7$, by means of which the jaw $i^4$ may be raised. It will be observed that the base portion $i^2$ of the clutch, the stationary front jaw $i^5$, and the pivoted jaw $i^4$ are of considerable width, the object of this being to provide an extensive clutch-surface, and the arm $i^3$ is also of considerable width, but is preferably not as wide as the base $i^2$. The clutch $i$, however, forms no part of the invention claimed in this application, but is made the subject of a separate application, filed January 22, 1904, and said clutch is shown and described in this case only for the purpose of showing or illustrating and describing the operation of my improved leather-stretching machine or apparatus.

In Fig. 1 of the drawings I have indicated in dotted lines at $m$ a hide which it is desired to stretch, and this hide is trimmed in the usual manner before putting it in the machine or apparatus, and this indication of the hide or sheet of leather to be stretched is made only for the purpose of showing the operation of the machine or apparatus.

In Figs. 2 and 3 I have shown another form of my improved machine or apparatus, which is intended for stretching one-half of a hide divided longitudinally of the center thereof, and in this form of construction the leather or the half of the hide is indicated by the dotted lines $m$ in Fig. 2 and shown in section in Fig. 3.

The only difference between the form of construction shown in Figs. 2 and 3 and that shown in Fig. 1 consists in the fact that the side rods or frame members $a$ are placed closer together and the cross-heads $b$ and $c$ are made shorter and a single bar $f$ is pivoted to each of said cross-heads at a point at one side of the longitudinal center thereof and one end of the bars $f$ is shorter than the other, as clearly shown, and the bars $f$ are free to swing over the side frame members $a$ and over the cross-heads $b$ and $c$, as clearly indicated in Fig. 3, and said Fig. 3 also shows the relative position of these parts in Fig. 1.

The nuts $d$ may be turned in any suitable manner or by any suitable means, and when turned in one direction the cross-head $c$ will be forced outwardly, and when turned in the other direction said cross-head may be moved inwardly; but my invention is not limited to this means for moving the cross-head $c$ outwardly, and this operation may be accomplished in any desired manner—as, for instance, by means of a windlass and a cord or chain connected with the cross-head at $n$.

In practice the machine or apparatus is placed on a suitable support and so placed that it cannot be moved longitudinally, suitable bearings being provided against which the ends of the frame members $a$ abut.

The operation of the form of construction shown in Fig. 1 will be as follows: Whenever it is desired to stretch a whole hide or a sheet of leather made from a whole hide from which power-belting is to be made, the said hide or sheet of leather is prepared in the usual manner and is placed on the machine or apparatus, the cross-head $c$ or the position thereof being adjusted to correspond with the length of the hide or sheet of leather. The opposite ends of the hide or sheet of leather are then connected with the clutches $i$, which are connected with the cross-bars $f$, and the cross-head $c$ is moved outwardly. It is well known that the central longitudinal part of a hide is tougher and stronger than the side portions, and this is the reason why a power-belt made from a hide of leather will stretch more at one edge than at the other. With my improved machine when the strain is thrown on the bars *f* all parts of the hide will be stretched; but the central part will not yield as much as the side parts, and the outer ends of the bars *f* will move outwardly more than the inner ends thereof, and the leather will thus be stretched more at the sides than at the middle thereof, and in this way all the stretching and yielding qualities of the leather will be taken out, and when a belt is made therefrom the belt will possess the same resistance power throughout its entire length and width and will not stretch more at one side than at the other.

In the form of construction shown in Figs. 2 and 3, which is designed for the purpose of stretching a half of a hide divided longitudinally, the longer ends of the bars *f* are connected with the central portion of the half of the hide or with part thereof which constitutes the central portion of the half of the hide, while the shorter ends thereof are connected with the side portion of the half of the hide which possesses less power of resistance and which will stretch more than the central portion of the hide, and the operation of this form of construction will be the same as that shown in Fig. 1, and with both forms of construction the hide or the sheet of leather formed from a hide will be stretched throughout all its parts, so as to render all its parts of equal density and equal strength in the resistance of force applied thereto, as in the case of power-belts made therefrom. Before placing the hide or sheet of leather on the apparatus it is wet or soaked, so as to render it soft and pliable and so as to facilitate the operation of the apparatus, and in both forms of construction the greatest amount of force is applied to that part of the hide or leather with which the shorter ends of the bars *f* are connected.

It is a well-known fact that the leather of the hide nearest the back is always thinner and tougher than other parts of the hide, and the thickness and softness of the hide increase toward the side edges thereof, and it is in order to fully stretch the side edges of the hide as well as the central part or back portion thereof that the lever arms or bars *f* are pivoted at one side of the middle thereof, as herein shown and described. Although I have described the lever arms or bars *f* as pivoted at one side of the center thereof, I may under certain circumstances, according to the quality of the hide or leather to be stretched, pivot said arms at the middle and accomplish results similar to those hereinbefore described, and my invention is not limited to any particular arrangement of the pivotal support of the said lever arms or bars *f*.

From the foregoing description it will be seen that my invention or the chief feature thereof comprises an oblong frame, lever arms or bars mounted transversely thereof and adapted to swing in a horizontal plane parallel with said frame, said lever arms or bars being pivotally attached to said frame, one of said lever arms or bars being movable longitudinally of the main part of said frame when the latter is held stationary, and means for securing a sheet or hide of leather to said bars, and while I have shown and described the preferred devices for connecting the hide or sheet of leather with said lever arms or bars my invention is not limited to these devices and any other suitable means may be employed for securing a hide or sheet of leather to said bars without departing from the spirit of my invention or sacrificing its advantages, and other forms of devices may also be employed for attaching the lever arms or bars to the frame and for moving said lever arms or bars at one end of the frame longitudinally thereof.

Having fully described my invention, what I claim as new, and desire to secure by Letters Patent, is—

1. A leather-stretching apparatus, comprising parallel side members provided with two cross-heads one of which is stationary and the other movable longitudinally of said side members, bars pivoted to said cross-heads so as to swing over said cross-heads and said parallel members, clutch-holders pivotally connected with said bars and adapted to swing thereon and clutches adjustably mounted on said holders, substantially as shown and described.

2. A leather-stretching apparatus, comprising parallel side members, two cross-heads connected with said side members one of which is stationary and the other movable longitudinally thereon, two cross-bars pivotally connected with each of said cross-heads, the outer ends of said bars being shorter than the inner ends thereof, clutch-holders detachably and pivotally connected to said cross-bars, and clutches adjustable on said holders, substantially as shown and described.

3. A machine of the class described, provided with a clutch-holder comprising a bar having holes at intervals and a clutch the base portion of which is connected with said bar by means of the tongue-and-groove construction, said clutch-holder being also provided with a vertically-movable locking-pin adapted to enter the holes in said bar, substantially as shown and described.

4. In a leather-stretching apparatus, a frame, bars arranged transversely of said frame adapted to swing in a horizontal plane parallel with said frame, said bars being pivotally mounted in respect to said frame, and means for securing a hide or sheet of leather to said bars, said construction including means whereby the distance between said bars can be increased to stretch the said hide or sheet of leather in a plane parallel with the said frame, substantially as described.

5. In a leather-stretching machine, a frame, bars extending transversely of and in a plane parallel to said frame and pivotally mounted in respect to the said frame, means for securing opposite sides of a hide or sheet of leather to said bars, in the plane of said bars and means for moving the parts secured to one side of the said hide or sheet of leather longitudinally of the frame to stretch the leather, the said hide or sheet of leather being held in a plane parallel to said frame during the operation of stretching, substantially as described.

6. In an apparatus for stretching leather, a frame, a plurality of bars extending transversely of said frame, and pivoted in respect to said frame to swing in a plane parallel to said frame, devices for securing the opposite sides of a hide or sheet of leather to all of said bars, in the plane of the same, and means whereby the distance between the bars on opposite sides of said hide or sheet of leather may be increased to stretch the same in a plane parallel to the plane of the said frame, substantially as described.

7. In an apparatus for stretching leather, a frame composed of parallel side members and transverse end members, bars extending transversely of said frame and in a plane parallel thereto, and pivotally mounted to swing in said plane, means for securing said bars to opposite sides of a hide or sheet of leather, the parts on one side of said hide or sheet of leather and secured thereto being movable in respect to said frame in the plane of said bars, and means whereby said movable parts can be moved away from those on the opposite side of said hide or sheet of leather to stretch the same in a plane parallel to the plane of said frame, substantially as described.

8. In a leather-stretching apparatus, a frame composed of side and end members, one of said end members being movable longitudinally of said frame, bars extending transversely of said frame and pivotally mounted on said end members to swing in a plane parallel to the plane of the frame, means for securing a hide or sheet of leather to said pivoted bars, and means for moving the movable end member away from the other to stretch the leather, said leather being held during the operation in a plane parallel with the plane of the said frame, substantially as described.

In testimony that I claim the foregoing as my invention I have affixed my signature hereto, in the presence of the subscribing witnesses, this 31st day of January, 1905.

EZRA L. POST.

Witnesses:
C. E. MULREANY,
F. A. STEWART.